United States Patent [19]

Wright et al.

[11] Patent Number: 4,869,746
[45] Date of Patent: Sep. 26, 1989

[54] STRAIGHT LINE SHEAR MECHANISM

[75] Inventors: Douglas W. Wright, Tarriffville; Alan W. Menard, Bolton, both of Conn.

[73] Assignee: Emhart Industries, Inc., Farmington, Conn.

[21] Appl. No.: 315,955

[22] Filed: Feb. 27, 1989

[51] Int. Cl.⁴ .............................................. C03B 7/10
[52] U.S. Cl. ...................................... 65/334; 65/221; 65/332; 83/578; 83/623
[58] Field of Search ................ 65/221, 326, 332, 334; 83/578, 623

[56] References Cited

U.S. PATENT DOCUMENTS

| | | | |
|---|---|---|---|
| 4,174,647 | 11/1979 | Dahms | 65/334 X |
| 4,214,494 | 7/1980 | Dahms | 83/623 X |
| 4,215,611 | 8/1980 | Dahms | 83/623 |
| 4,699,643 | 10/1987 | Kulig | 65/332 |
| 4,728,354 | 3/1988 | Vilk et al. | 65/334 |
| 4,791,845 | 12/1988 | Wright | 65/334 |
| 4,813,994 | 3/1989 | Kulig | 65/334 |

*Primary Examiner*—Arthur Kellogg
*Attorney, Agent, or Firm*—Spencer T. Smith

[57] ABSTRACT

A straight line shear mechanism has rack driven shears which are operated by a pneumatic cylinder. Opposite ends of the operating rod of the pneumatic cylinder are connected via nail head couplings which permit rotation of the rod about its axis and which automatically accommodates slight misalignments to minimize distortion of the rod.

3 Claims, 1 Drawing Sheet

STRAIGHT LINE SHEAR MECHANISM

The present invention relates to straight line shears for cutting gobs from continuously fed runners of molten glass.

In a straight line shear, such as is disclosed in U.S. Pat. No. 4,699,643, opposed shear pairs periodically cut gobs from a corresponding number of runners of molten glass. This molten glass distributes a tremendous amount of radiant energy which heats up nearby objects. To drive the shear pairs, a pneumatic cylinder is used. The rod of this pneumatic cylinder is subject to excessive wear in this hot environment as a result of rod distortion due to misalignment of the structures to which the rod is connected. Such excessive wear results in premature failure of the pneumatic cylinder and stoppage of the entire I.S. machine and this impacts overall productivity.

It is accordingly an object of the present invention to improve the uptime of such a shear mechanism by reducing the distortion of the rod to thereby reduce wear and increase operating life.

Other objects and advantages of the present invention will become apparent from the following portion of the specification and from the following drawing which illustrates in accordance with the mandate of the patent statutes a presently preferred embodiment incorporating the principles of the invention.

Referring to the drawings.

Figure 1:
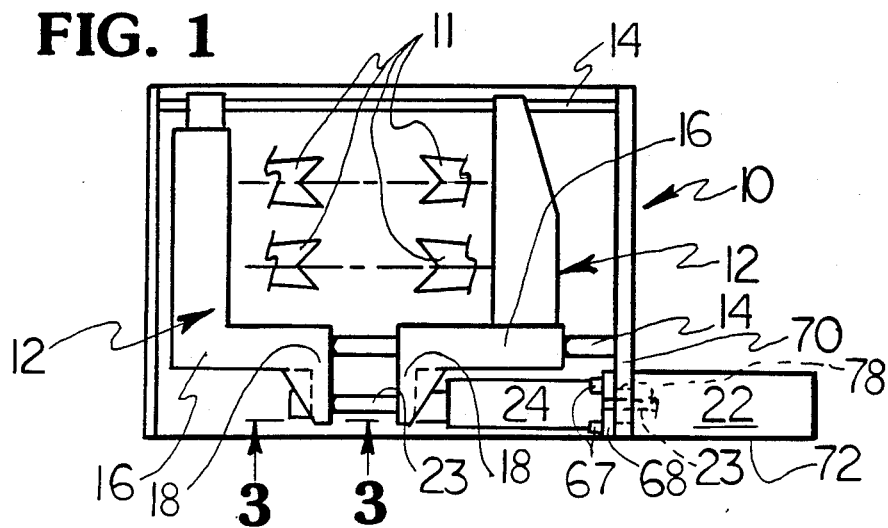
FIG. 1 is a top view of a straight line shear mechanism.

Runners of molten glass (not shown) are fed, by gravity, to the straight line shear mechanism 10, where discrete gobs (also not shown) are formed by the cutting action of a corresponding number of opposed shear 11 pairs. Each set of shears 11 is secured to an L-shaped slide 12 which is displaceable along parallel guide rails 14. The L-shaped slides have cylindrical portions 16 with integral brackets 18. One of the rack elements 20 (FIG. 2) of a rack and pinion mechanims 22 is connected, via the rod 23 of the pneumatic cylinder 24, to the left hand bracket 18, and the other rack element 20, which extends below the pneumatic cylinder 24, is directly connected to the other bracket 18. Each rack element is supported by a cylindrical housing 21. When the pneumatic cylinder 24 is operated, the shear 10 pairs will be conjointly displaced towards or away from each other.

Figure 2:
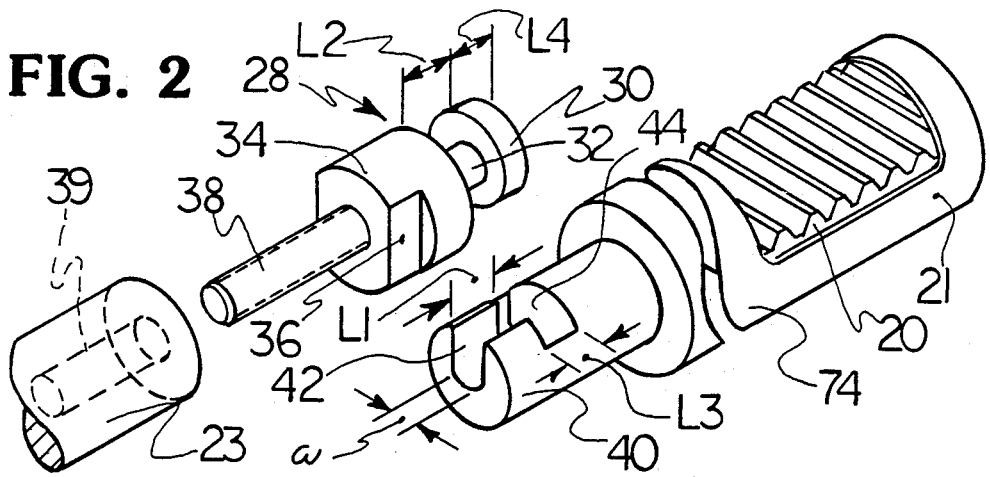
FIG. 2 is an oblique view, with the parts separated, of the coupling between the rod of the pneumatic cylinder and a rack element with the teeth of the rack being presented facing up instead of facing down for purposes of illustration.

A nail head coupling 28 which connects the rod 23 to the upper rack element 20 is illustrated in FIG. 2. It includes a cylindrical head portion 30, a reduced diameter portion 32, a third cylindrical portion 34 approximately the same diameter as the head portion 30 and having flats 36 defined therein to receive an installation tool and an elongated threaded portion 38, which is to be threaded into a threaded bore 38 in one end of the rod 23.

The free cylindrical end 40 of a rack 20 has a vertical, upwardly opening slot 42 defined therein. The width W of this slot is slightly larger than the diameter of the reduced diameter coupling portion 32 to permit its placement in this slot. A second vertical, upwardly opening slot 44 is defined in the rack element axially behind the first slot 42. This slot 44 defines the axial length L1 of the front slot 42 (slightly smaller than the axial length L2 of the reduced diameter coupling portion 34). The axial length L3 of the second slot 44 is also selected to be slightly larger than the axial width L4 of the nail head portion 30 of the coupling 28. The desired orientation of these slots is maintained by the rack and pinion mechanism 22.

Figure 3:
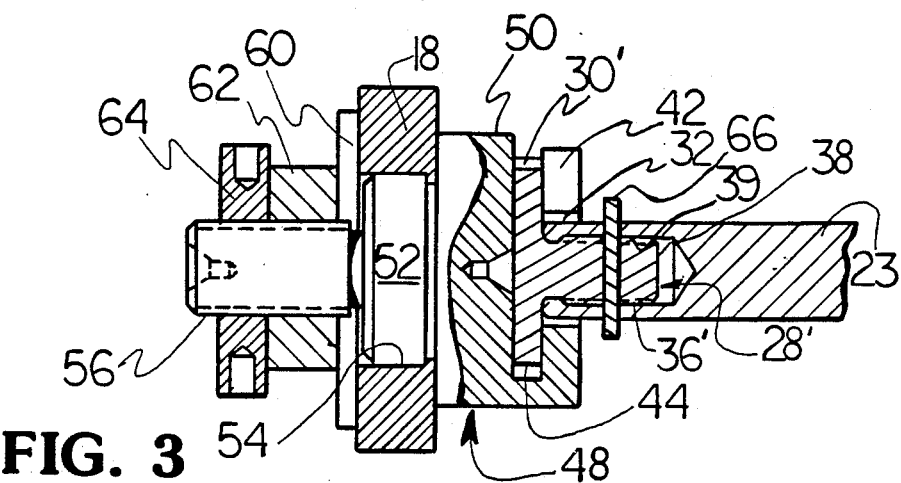
FIG. 3 is a modified view of the straight line shear mechanism, partly in section, taken at lines 3—3 of FIG. 1.

The coupling receiving structure 48, which is to couple either the other end of the rod 33 or a rack 20 to the bracket 18, is shown in FIG. 3. This structure includes an end cylindrical portion 50 having the same first 42 and second 44 vertical slots defined therein, a bushing 52 which is received by a bracket opening 54 and a threaded end portion 56. The coupling receiving structure 48 is secured to the bracket 18 by a thrust washer 60, a split nut 62 and a threaded collar 64. The nail head coupling 28' has a cylindrical head portion 30' and a reduced diameter threaded portion 36' which is threadedly inserted into a threaded bore 39 in the rod 23. A roll pin 66 can be used to secure the coupling 28' to the rod 23.

The rack and pinion gear box 22 is secured in position by six screws. Four of these screws 67 pass through the pneumatic cylinder mounting flange 68 and the side frame 70 into the gear box housing 72, and two additional screws (not shown) extend through the side frame 70 into the gear box housing 72. To disconnect the pneumatic cylinder 24, these six screws are removed so that the gear box housing 72 can be removed. The rack housing 21 can then be retracted exposing the coupled end 40 of the rack 20. The right end of the pneumatic cylinder rod 23 can then be lifted separating the coupling 28 from the rack 20 (the hole 78 in the frame through which the rod 23 passes is sufficiently large to permit such movement). The left end of the rod 23 is then lifted to complete removal of the pneumatic cylinder 24.

The coupling permit rotation of the rod about its axis and automatically accommodates a small amount of misalignment from the bracket 18 to the rack 20, thereby minimizing rod distortion, and hence, rod wear.

We claim:

1. A straight line shear mechanism for cutting discrete gobs from a runner of molten glass which is to be formed into a glass container comprising a pair of opposed shear blade assemblies mounted for simultaneous displacement from retracted positions to advanced shear positions and each including mounting bracket means including a cylindrical portion, means for displacing said shear blade assemblies including a pneumatic cylinder having a cylindrical housing and an operating rod extending outwardly from either end of said cylindrical housing, said rod having a threaded axial bore defined in each end, and a rack and pinion assembly having at least one rack element, means for coupling one end of said rod to one of said rack elements and for coupling the other end of said rod to one of said mounting bracket means including a coupling structure having a cylindrical portion at one end, and adjacent reduced diameter portion and a threaded portion at the other end, first slot means defined in the end of said one rack element and in the cylindrical portion of one of said mounting bracket means for receiving said reduced diameter portion, said first slot means having a length corresponding to the length of said reduced diameter portion, and second slot means defined in said one rack element and in said cylindrical portion of said mounting bracket means adjacent to said first slot means for receiving said coupling structure cylindrical end portion and having a length corresponding to the length of said cylindrical end portion, said threaded end portion of said coupling structures threadedly received by said threaded rod bores and said cylindrical and reduced diameter portions being received by said first and second slot means defined in said bracket means, and in said rack element so that said rod can rotate about its axis and so that slight misalignments between said rod and said bracket means and said rack element can be accommodated without rod distortion, thereby minimizing rod wear.

2. A straight line shear mechanism according to claim 1, wherein said coupling structure further comprises an increased diameter portion intermediate said threaded end portion and said reduced diameter portion.

3. A straight line shear mechanism according to claim 1 further comprises means for preventing removal of said coupling structure threadedly secured to said rod.

* * * * *